(12) United States Patent
Riester et al.

(10) Patent No.: US 7,993,065 B2
(45) Date of Patent: Aug. 9, 2011

(54) PRINTER HAVING PRINTING UNIT AND MOVABLE MEDIA UNIT

(75) Inventors: Thomas Riester, Villingen-Schwenningen (DE); Herbert Kirner, Villingen-Schwenningen (DE); Axel Huegle, Furtwangen (DE)

(73) Assignee: Siemens Aktiengesellschaft, München (DE)

( * ) Notice: Subject to any disclaimer, the term of this patent is extended or adjusted under 35 U.S.C. 154(b) by 972 days.

(21) Appl. No.: 10/554,402

(22) PCT Filed: Mar. 23, 2004

(86) PCT No.: PCT/EP2004/003069
§ 371 (c)(1), (2), (4) Date: Oct. 24, 2005

(87) PCT Pub. No.: WO2004/100078
PCT Pub. Date: Nov. 18, 2004

(65) Prior Publication Data
US 2006/0233585 A1    Oct. 19, 2006

(30) Foreign Application Priority Data

May 12, 2003  (DE) .................................. 103 21 225

(51) Int. Cl.
*B41J 2/32*    (2006.01)
(52) U.S. Cl. .......................... 400/692; 400/693; 347/222
(58) Field of Classification Search .................. 400/691, 400/692, 693; 347/222
See application file for complete search history.

(56) References Cited

U.S. PATENT DOCUMENTS

| 6,392,677 | B1 | 5/2002 | Lais |
| 6,414,704 | B1* | 7/2002 | Yamashita ..................... 347/222 |
| 6,437,815 | B1 | 8/2002 | Burkart |
| 6,469,726 | B2* | 10/2002 | Sekiya .......................... 347/222 |
| 6,834,950 | B2 | 12/2004 | Hugle |
| 2004/0021763 | A1 | 2/2004 | Huegle |

FOREIGN PATENT DOCUMENTS

DE    40 05 810 A1    8/1991
DE    198 11 053 C2    9/1999
(Continued)

OTHER PUBLICATIONS

Derwent Abstract—DE 198 11 053 C2; Sep. 16, 1999; Maschinenfabrik WIFAG, Bern, Switzerland.

(Continued)

*Primary Examiner* — Leslie J Evanisko
(74) *Attorney, Agent, or Firm* — Cohen Pontani Lieberman & Pavane LLP

(57) ABSTRACT

A printer is disclosed having a media unit which can move relative to a printing unit. Until now, difficulties in aligning the media unit in the printer always resulted in a poor printing quality. To rectify this, the disclosed printer provides that the printing unit is designed so that it can move inside the housing, and elements are provided for aligning the printing unit with the media unit so that the printing unit and the media unit can be aligned with one another when the media unit is pushed in the direction of insertion. A resilient element enables the printing unit to be advantageously tensioned, in a manner that equalizes tolerances, against the support of the media unit in an operating position. This enables an advantageous equalization of work tolerances and positional tolerances, and the position of the print head relative to the medium to be printed.

21 Claims, 9 Drawing Sheets

FOREIGN PATENT DOCUMENTS

Figure 5:
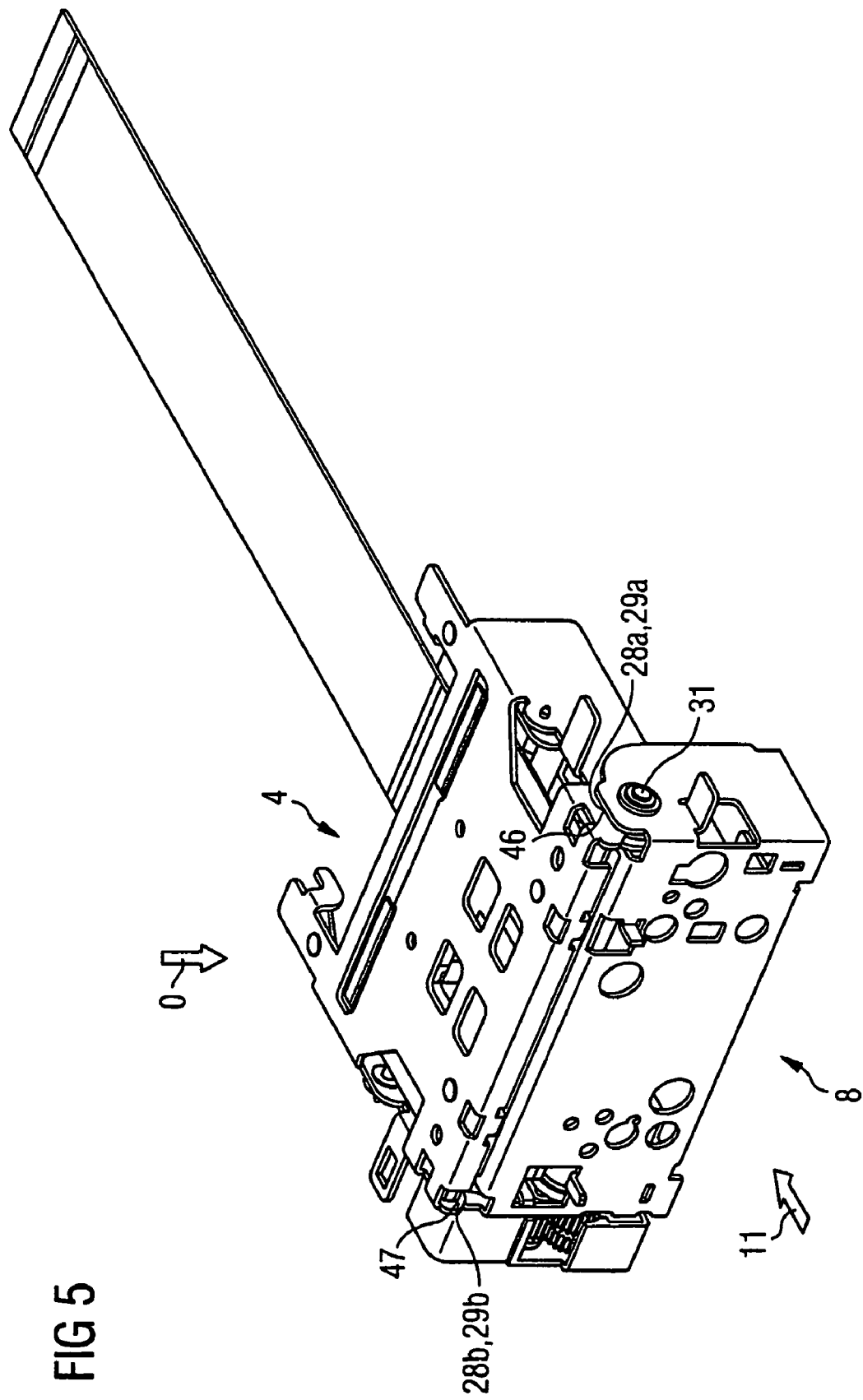

| | | |
|---|---|---|
| DE | 299 20 901 U | 2/2000 |
| EP | 1 086 818 A1 | 3/2001 |
| EP | 1 103 927 A2 | 5/2001 |
| GB | 1162331 A | 8/1969 |
| GB | 1 459 368 A | 12/1976 |
| RU | 2 195 704 C2 | 12/2002 |
| WO | WO 98/10380 | 3/1998 |
| WO | WO 02063571 A1 * | 8/2002 |

OTHER PUBLICATIONS

Derwent Abstract—DE 299 20 901 U; Feb. 17, 2000; Mannesmann VDO AG, D-60388 Frankfurt, Germany.

* cited by examiner

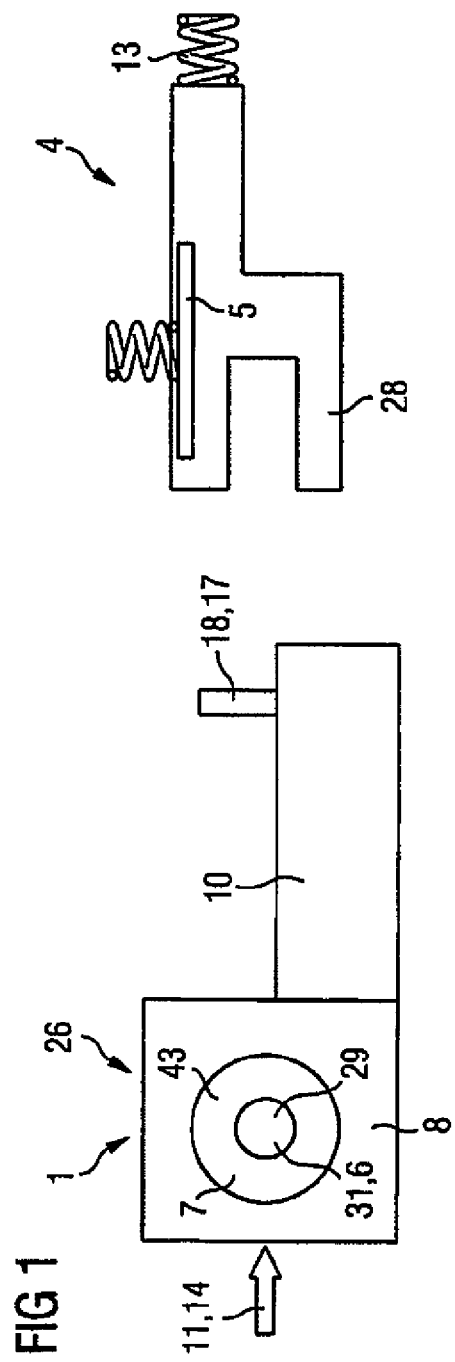
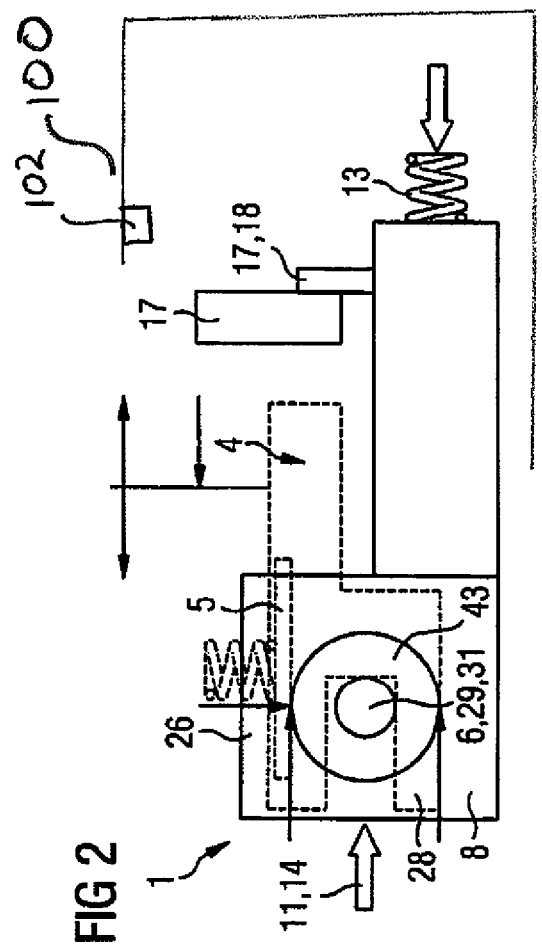

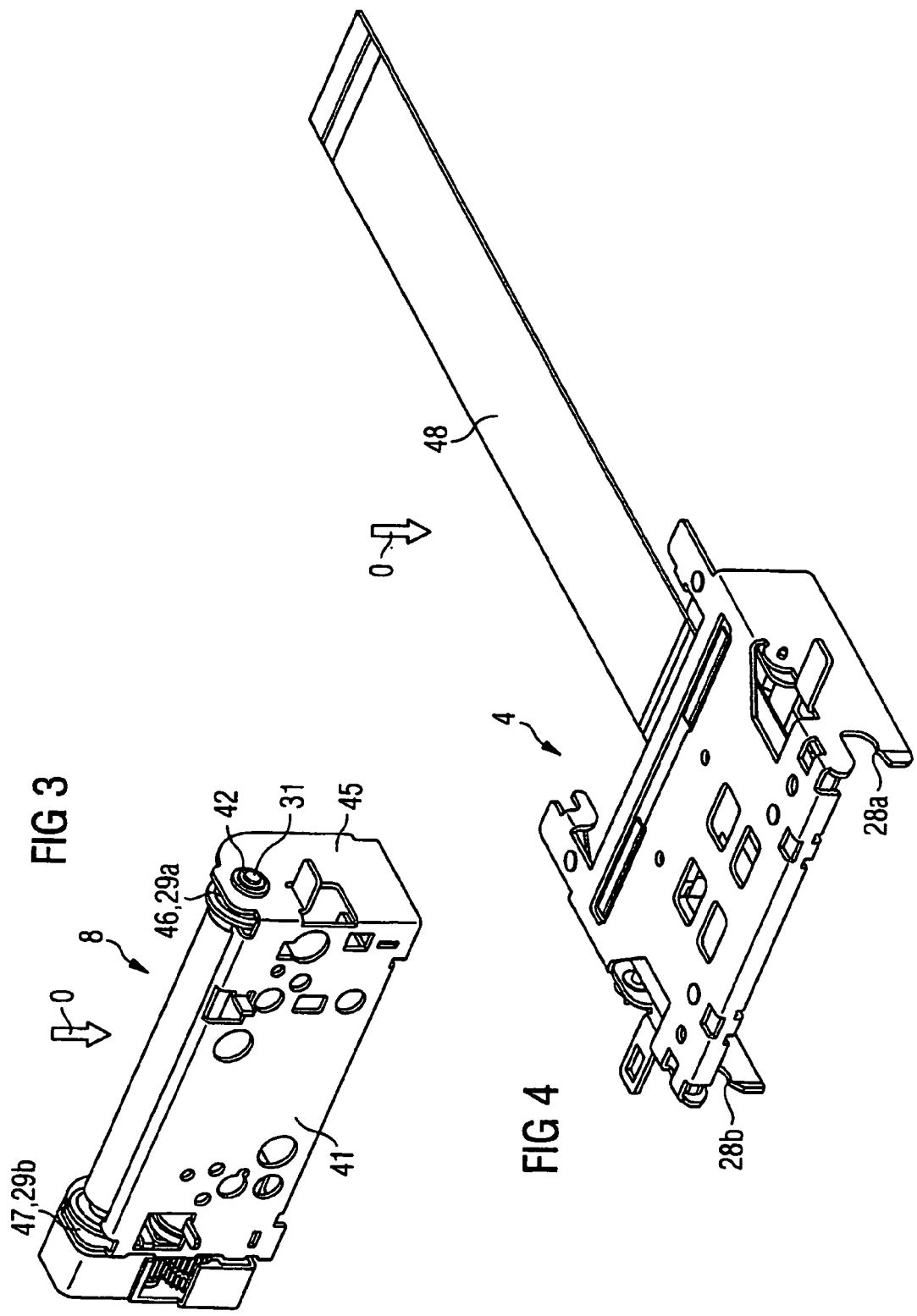

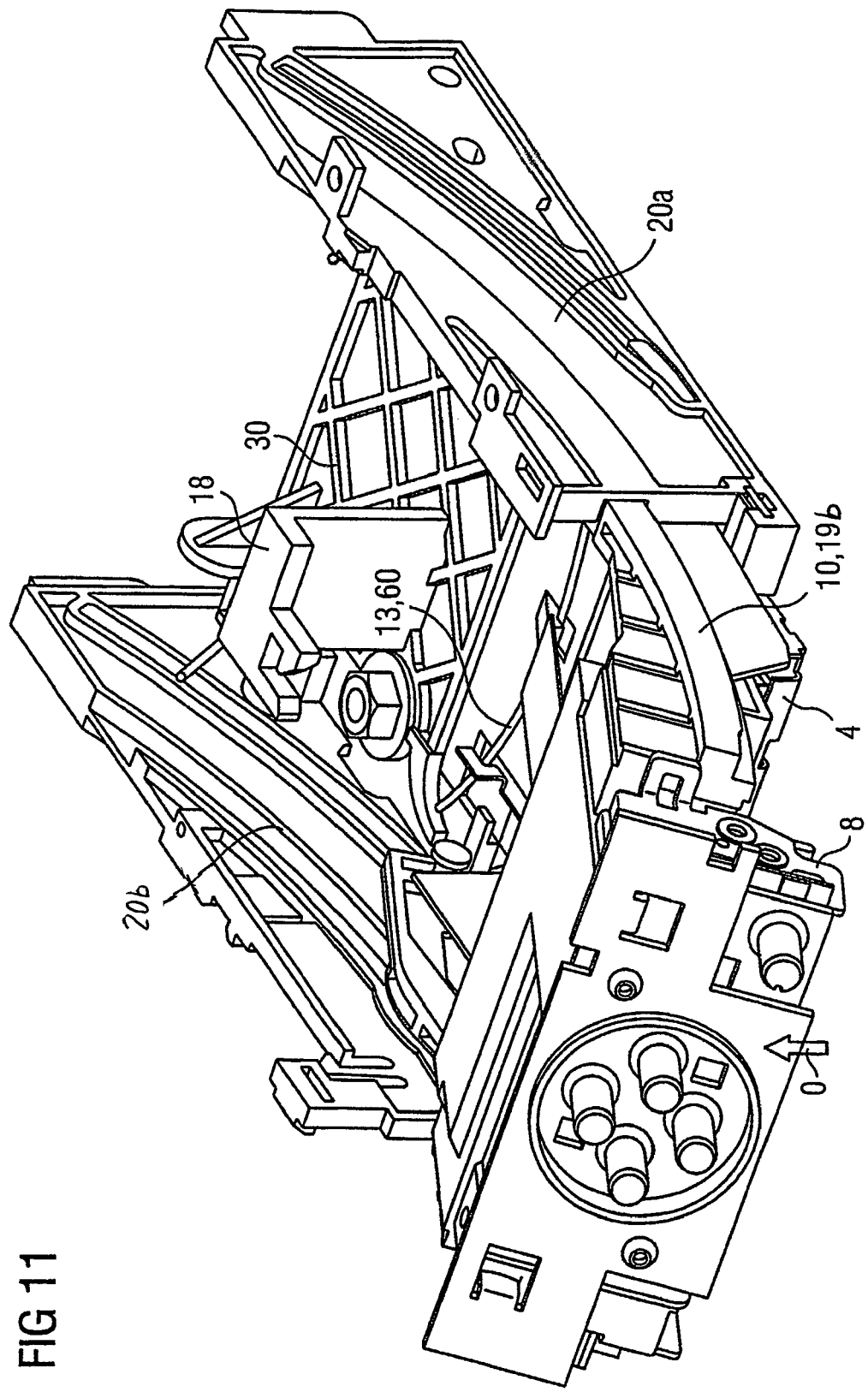

PRINTER HAVING PRINTING UNIT AND MOVABLE MEDIA UNIT

BACKGROUND OF THE INVENTION

The invention relates to a printer, in particular a printer of a tachograph for a motor vehicle, having a housing, a printing unit, a media unit for accommodating the medium which is to be printed, which media unit has a carrier and can be moved jointly with the carrier, relative to the printing unit, in a push-in direction into an operating position and counter to the push-in direction out of an operating position, and can be moved at least partly out of the housing, and the carrier has lateral first guide elements, in the manner of a drawer, which interact with second guide elements in such a way that the carrier can be moved in the push-in direction and counter to the push-in direction out of the housing.

An apparatus of this type is already known from German utility model 299 20 901.6 which deals with a tachograph of flat, parallelepiped-shaped design. The thermal printing head and the transport roller for the transport of the printing medium which is present as a tape spool can be separated spatially from one another by moving the carrier out of the housing of the printing apparatus. This arrangement is based on the need for it to be possible to change or refill the printing medium simply and with a small amount of manual maneuvers, without it being necessary to handle the sensitive and complicated mechanics of the transport unit for the printing medium and of the printing unit.

However, the technical implementation of this inventive idea has proved problematical in the past. If the transport module for the printing medium and the printing module are separated from one another during opening of the housing for changing the printing medium or the paper roll and are subsequently reconnected to one another, an only slightly changed position of the moved transport unit still has a negative effect on the printed result. On account of the bearing play required solely for the movability of the transport unit, an exact reproduction of the position of the transport unit relative to the printing unit is an aim which runs counter to the requirement for displaceability of the transport unit. The disadvantages of the prior art and the problems are increased additionally by the customary component tolerances which are already fixed from economic aspects. In conjunction with the fixed component tolerances, the movement play which is definitely required for the transport unit leads to unacceptable print quality results.

The German published document DE 40 05 810 A1 has already disclosed a thermal transfer printing apparatus, in which changing of the media is extremely complicated for the user on account of the need to thread in the endless medium which is to be printed. The European patent application EP 1 103 927 A2 discloses a tachograph having an integrated printing apparatus, it being possible for the printing apparatus, jointly with the storage trough for the printing medium, to be pulled out of the tachograph in the manner of a drawer for changing the media. However, the media change is comparatively complicated here, as the printing medium has to be threaded into the front part of the drawer. The arrangement of a printing unit with respect to a media unit in the housing of a tachograph, which arrangement is proposed in the international patent application WO 02/063571 A1, makes a simpler media change possible, it being possible for the media unit to be moved relative to the printing unit in the manner of a drawer and in a manner which can be pulled out of the housing. However, this arrangement requires very high precision of the drawer-like guide for the media unit, in order to achieve the required print quality.

Proceeding from the problems and disadvantages of the prior art, the invention has been based on the object of providing a printer, the media unit of which printer can be moved relative to the printing unit for accommodating the medium to be printed, and which printer at the same time produces a printed image of convincing quality.

SUMMARY OF THE INVENTION

According to the invention, the object is achieved by a printer or a printer, which is integrated into a tachograph of a motor vehicle as described below.

The invention eliminates the problem, which prevails in the prior art, of play and tolerance compensation in the guide of the transport unit which can be moved relative to the printing unit, unlike the concept of wishing to reproduce the position of the transport unit after every movement period sufficiently exactly in the overall arrangement for a satisfactory print quality. Instead, according to the invention, only the printing unit is positioned sufficiently exactly relative to the carrier with the media unit, it being possible for the combination of these two modules to be arranged in the overall construction of the printer with the comparatively large positional tolerances. According to the invention, this possibility opens up because the printing unit can move in the overall construction of the printer and can be oriented relative to the media unit when the latter is pushed into the housing. In this way, it is possible for the first time, while avoiding expensive low tolerances of the guide components of the carrier, to combine a satisfactory print quality with comfortable print-media changing in a printer of the generic type.

The media unit advantageously has a carrier which can be moved, relative to the printing unit, in a push-in direction into an operating position and counter to the push-in direction out of an operating position, and can be moved at least partly out of the housing. This carrier can serve to accommodate additional components and is expediently composed of a robust material which largely avoids undesired deformations in the event of a correspondingly rigid static design.

In order that the printing unit is always at the spacing required for a satisfactory printed image from the medium to be printed, it is expedient if the printing unit can be moved in the housing, in the push-in direction and counter to the push-in direction. Moreover, further degrees of freedom of the movability are appropriate, even perpendicularly with respect to the push-in direction, in order that the position of the printed image on the medium is corrected with the pushing-in action. In addition, it is expedient if the printing unit also has translatory degrees of freedom, with the result that an oblique position of the media unit with respect to the printing unit can be corrected with the pushing-in action. To this extent, what is known as a floating mounting of the printing unit in the housing, which mounting combines the abovementioned degrees of freedom with one another, is extremely beneficial for the print quality.

In a practical implementation, the different advantageous degrees of freedom are expediently attained by means of at least one elastic element which presses the printing unit counter to the push-in direction with a force, with the result that the force presses the printing unit counter to the carrier when the latter is pushed in. The elastic element or elements is/are expediently configured in such a way that a plurality of degrees of freedom of mobility are attained, or the printing unit is mounted in a floating manner.

One advantageous development of the invention provides for the printing unit to have a first contact region and the housing to have a second contact region and, by means of the force of the elastic element, the printing unit to move with the first contact region in the direction of the second contact region, in a rest position which is not the operating position, the first contact region to bear against the second contact region and the printing unit to be clamped in this way between the elastic element and the second contact region by means of the force of the elastic element. Clamping the printing unit in a manner according to the invention in the housing by means of the elastic element and the interaction of contact regions has the advantage that the printing unit it always secured in a defined position and cannot perform any uncontrolled movements in the housing. Damage to the printing unit can be avoided in this way.

A further practical implementation of the invention provides for the carrier to have a first contact face, the printing unit to have a second contact face, and for the first and second contact faces to correspond with one another in such a way that, when the carrier is moved in the push-in direction, the first contact faces come into contact with the second contact faces, in each case in pairs. In this development of the invention, the advantages according to the invention come to bear in particular, because a one-off adjustment of the functional components with respect to the respective contact faces which is related in each case to the module is sufficient to ensure satisfactory operation of the printer. In addition, the contact faces can be configured to be comparatively small in relation to the guide faces of the carrier, which minimizes the costs of low-tolerance manufacture of the contact faces.

In order that there is not only satisfactory positional accuracy of the printing unit with respect to the carrier in the perpendicular direction of contact faces, but high accuracy of the positioning of the printing unit relative to the carrier prevails perpendicularly to the vertical axes of the contact faces, it is expedient if the printing unit has at least one first centering element and the carrier has at least one second centering element which corresponds to the first centering element, with the result that, when the carrier is moved in the push-in direction, the carrier and the printing unit are oriented in the housing by means of the centering elements in the operating position, relative to one another in the spacing direction, and/or are centered in at least one direction perpendicular with respect to the spacing direction. The centering elements can comprise pairs of interacting, oblique or conical faces, or of cones which interact with corresponding conical recesses. Here, it can also be advantageous if a centering element assumes the centering function only in one direction perpendicularly with respect to the vertical axis of the contact faces or the vertical movement axis. Furthermore, a fork-shaped centering element has proved to be appropriate, which interacts with a cylindrical corresponding part in such a way that the circumferential surface of the cylinder is guided by those flanks of the fork-shaped receptacle which face one another.

An expedient system division of the printer into components which are fastened to the movable carrier and those which are fastened to the remaining elements of the printer results if the media unit which is fastened to the carrier has a receptacle for a paper roll and a transport unit for paper of the paper roll.

In order that the carrier is always held securely during operation, it is expedient if the media unit or the carrier is configured in such a way that it can be locked in an operating position in the housing by means of a locking unit. In a locked position, the locking unit holds the media unit in an operating position in the housing. In an unlocked position, the media unit or the carrier can be moved at least partially out of the housing. Here, the movable parts of the locking unit should be constituent parts of the carrier which are fastened to the carrier. Any overtravel which the locking mechanism requires in order to pass to the locked position or to latch there is advantageously compensated for by means of the anchoring of the printing unit in the housing, which anchoring can move in accordance with the invention.

Stationary parts of the locking unit which interact in a locking manner with the movable parts on the carrier are expediently connected fixedly to the housing. In this way, the media unit is fixed in the housing in a shockproof manner.

In a further refinement of the invention, the locking element has at least two holding elements. These preferably stationary holding elements expediently interact with in each case one movable corresponding locking element, for example in the form of a sliding bolt, a hook or a movable pin. The holding elements are preferably arranged symmetrically on the media unit and/or with respect to an elastic element which presses the printing unit counter to the push-in direction with a force.

In order to increase the operational reliability, it is expedient if the movable parts interact with a sensor which senses a locked position, in which the media unit or the carrier and the printing unit are fixed in the spacing direction with respect to one another, and/or an unlocked position, in which the media unit or the carrier and the printing unit are not fixed in the spacing direction with respect to one another. Here, it is appropriate if the sensor is connected to a central controller which retrieves the locking state by means of the sensor and signals operational readiness as a function thereof.

As, in the preferred area of use of the printer according to the invention, contamination of the functional components of a printer can also occur in the rough operating conditions and the dirty environment, it is expedient if, in an operating position, the carrier is sealed off with the housing as tightly as possible with respect to the surroundings.

For high mounting tolerance and in the interest of fully automatic series production, it is appropriate if the printer has at least one guide which has at least two first guide elements which are arranged on the carrier, and has two second guide elements which correspond with the first guide elements on the carrier, with the result that the carrier is guided by means of the guide in the event of a movement in or counter to the push-in direction, and the second guide elements are fastened to a central connecting element. The result is a precisely defined spacing between the guide rails, and the bearing play for the carrier is not dependent on further components. The unit of carrier and printing unit can thus also be tested outside the finished complete device.

BRIEF DESCRIPTION OF THE SEVERAL
VIEWS OF THE DRAWINGS

Figure 6:
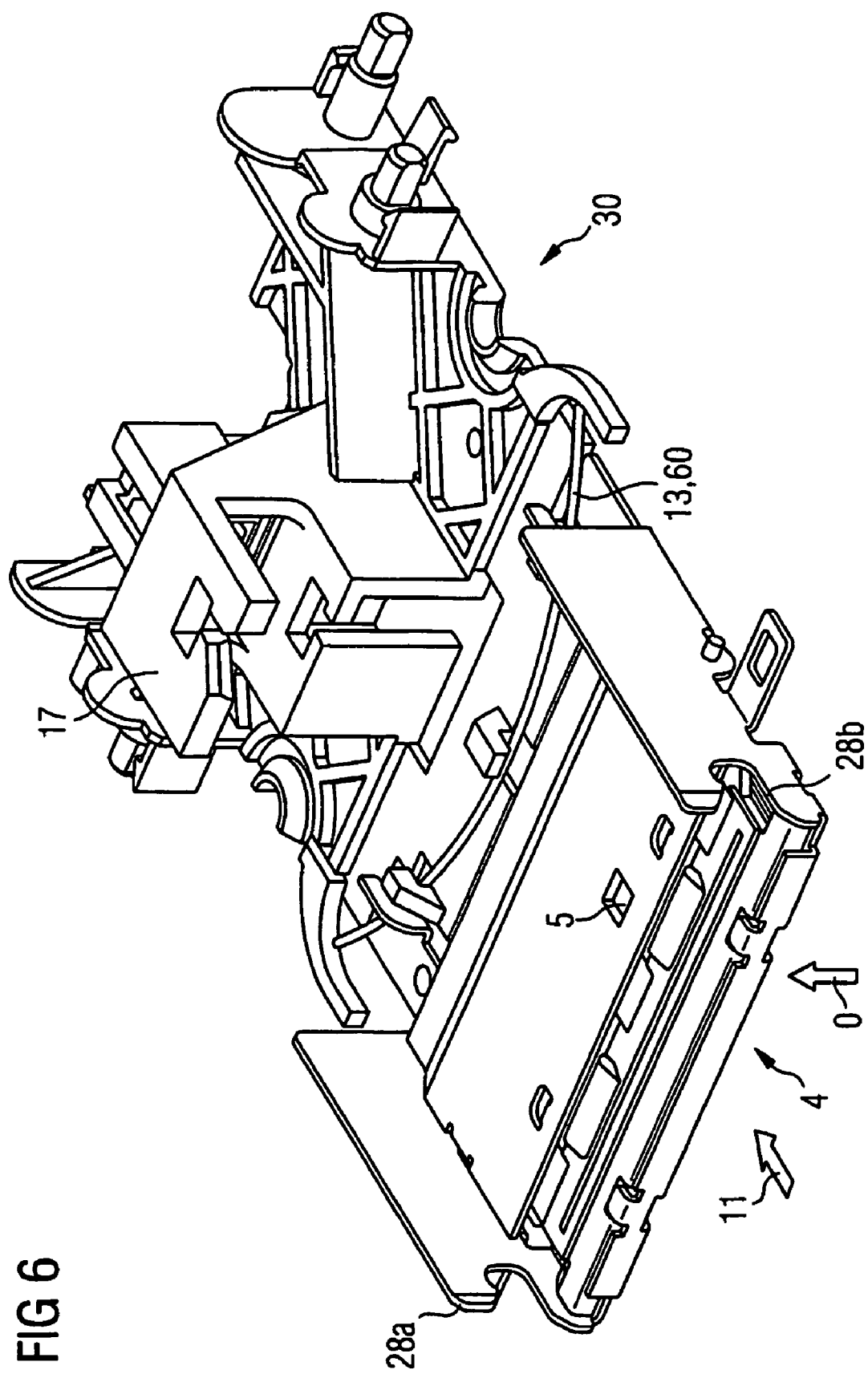
Figure 7:
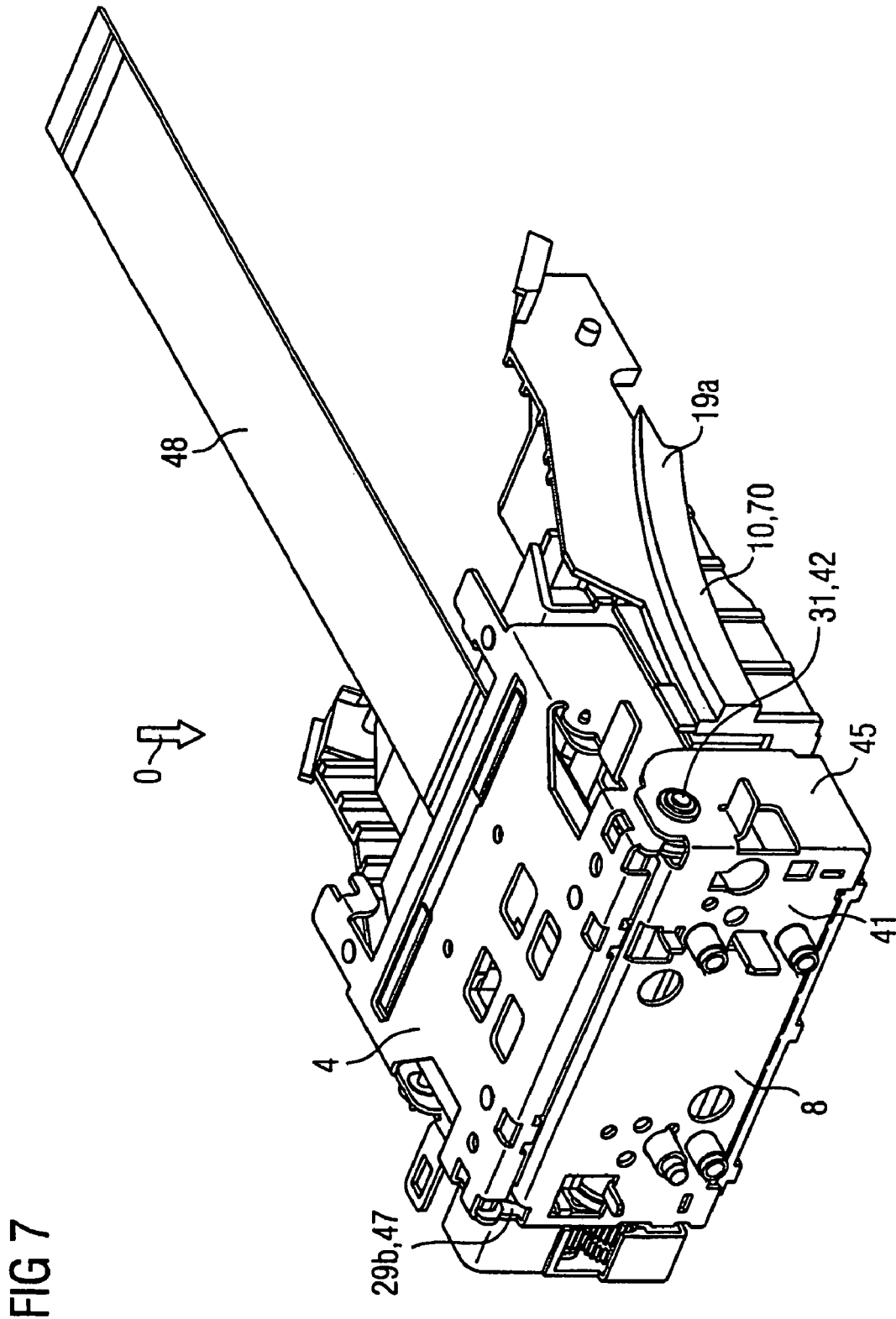
Figure 8:
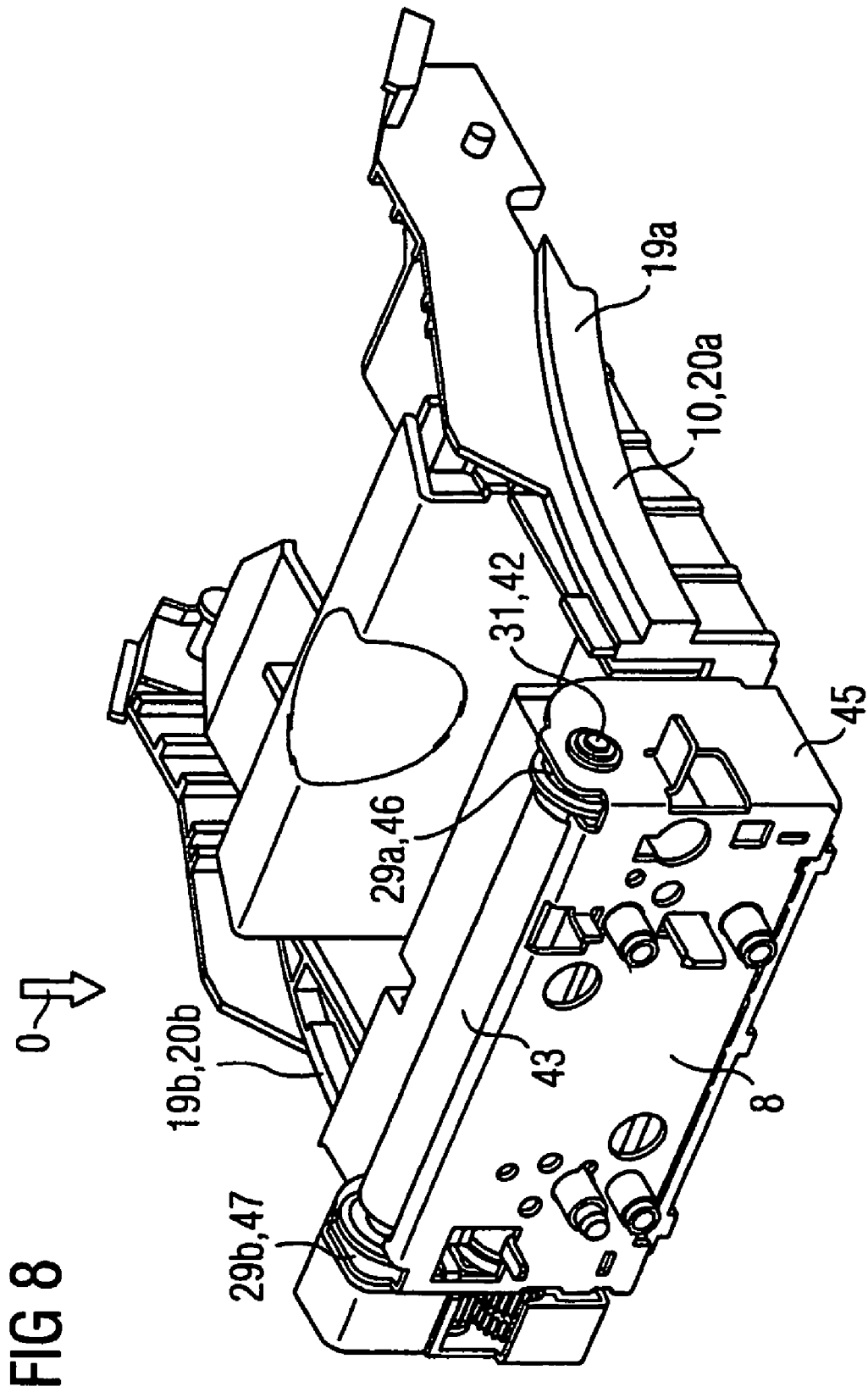
Figure 9:
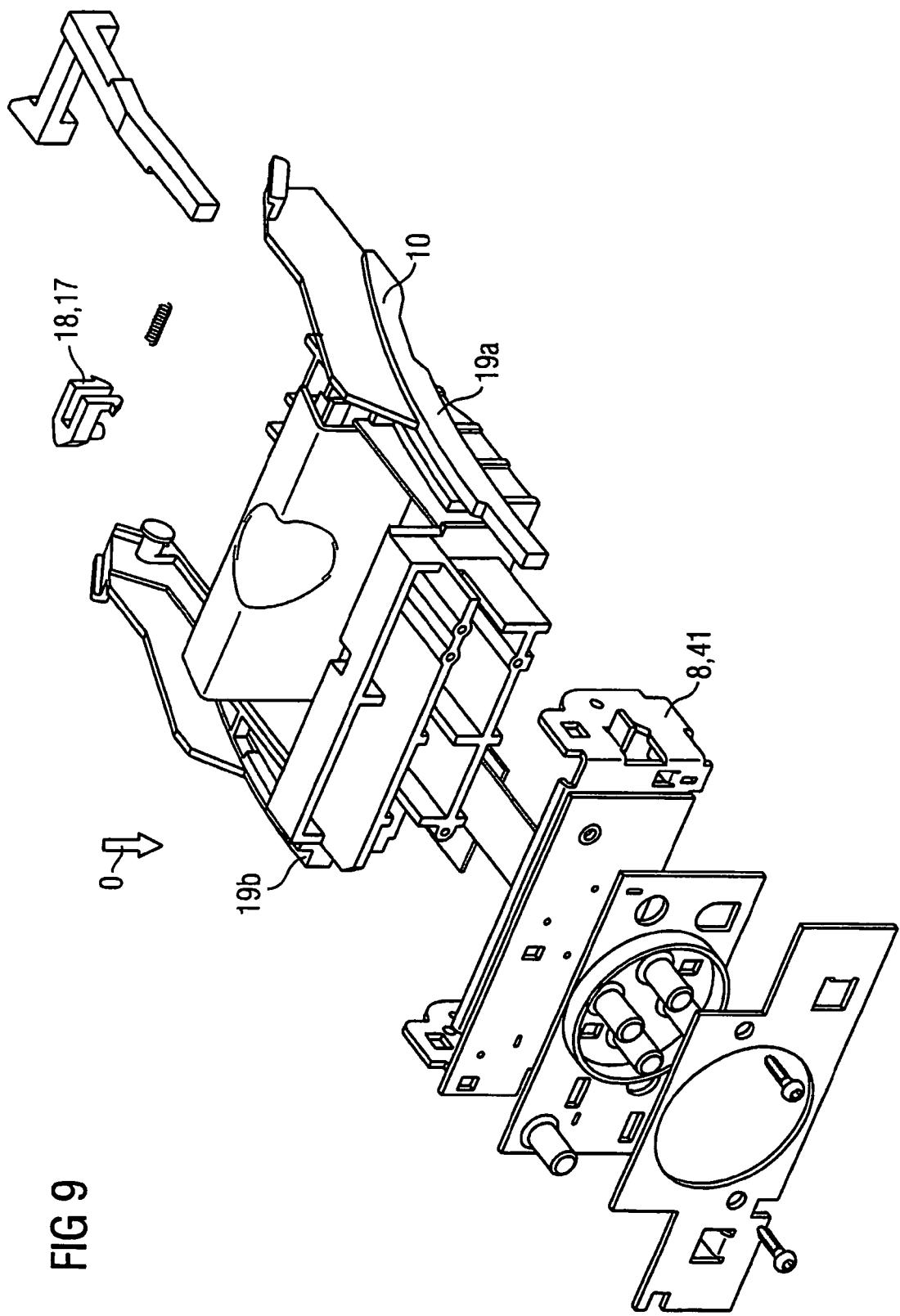
Figure 10:
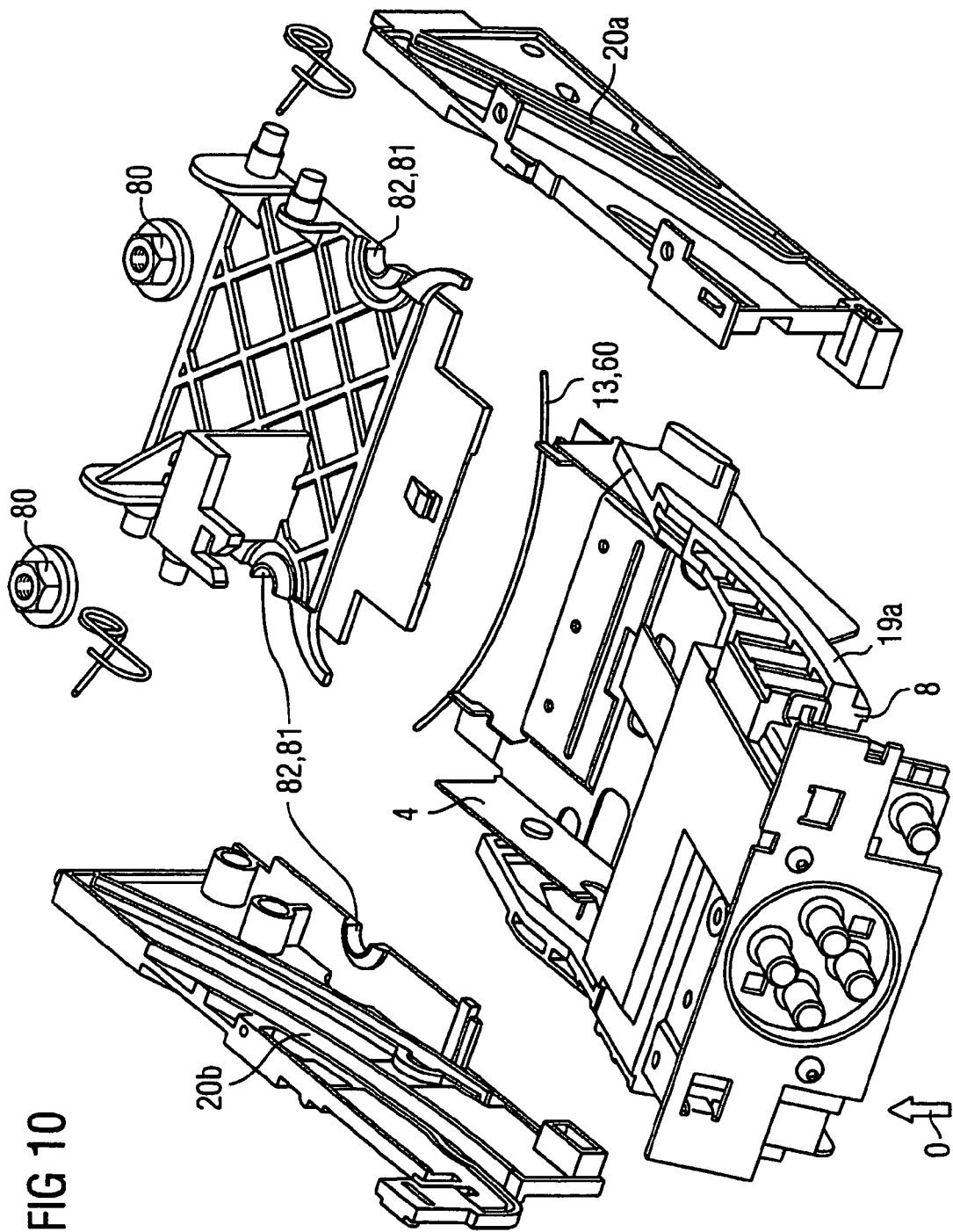

In the following text, one preferred exemplary embodiment of the invention will be described in greater detail for clarification, with reference to drawings in which:

FIGS. 1 and 2 show diagrammatic illustrations of different phases of the relative movement of the printing unit and the carrier, FIG. 3 shows a perspective illustration of a transport unit, as viewed from obliquely below, FIG. 4 shows a perspective illustration of a printing unit, as viewed from obliquely below, FIG. 5 shows a perspective illustration of the assembly of a printing unit and a transport unit, as viewed from obliquely below, FIG. 6 shows a perspective illustration of the assembly of a connecting element with a printing unit, as viewed from obliquely above, FIG. 7 shows a perspective illustration of the assembly of a transport unit, a printing unit and a carrier, as viewed from obliquely above, FIG. 8 shows a perspective illustration of a transport unit and the carrier, as viewed from obliquely above, FIG. 9 shows a perspective exploded illustration of a carrier with transport unit and elements of a locking unit, as viewed from obliquely above, FIG. 10 shows a perspective exploded illustration of the assembly of a transport unit, a printing module, a carrier, lateral guide elements and a connecting element, as viewed from obliquely below, and FIG. 11 shows a perspective assembly of a printing unit, a transport unit, a carrier, two lateral guide elements and a connecting element, as viewed from obliquely below.

DETAILED DESCRIPTION OF THE INVENTION

In the illustrations of a printer 1 in FIGS. 3 to 11, in each case an orientation direction which is denoted as above is symbolized by an arrow having the designation O.

In the diagrammatic illustrations of a printer 1 in FIGS. 1 and 2, the media unit 26 is provided with the designation 26 and the printing unit 4 is provided with the designation 4. The media unit 26 comprises a transport unit 8 with a transport roll 43 which is mounted rotatably about a receptacle 6 which is configured as a shaft 31. The medium (not shown) to be printed, preferably paper of a paper roll, is configured as a tape spool and is arranged on a cylindrical receptacle (not shown). The transport unit 8 with the transport roll 43 and the shaft 31 is fastened to a carrier 10.

Movable parts 18 of a locking unit 17 are likewise a constituent part of the carrier 10.

The carrier 10 is mounted in a housing (not shown) such that it can move in and counter to a push-in direction 11. In order to change the medium, the carrier 10 can be moved partially out of the housing (not shown).

The printing unit 4 is mounted in the housing (not shown) such that it can move in the push-in direction 11. The printing unit 4 has a print head 5 which is fastened resiliently to the printing unit 4. An elastic element 13 presses the printing unit 4 counter to the push-in direction 11 in the direction of the transport unit 8 and the carrier 10.

The printing unit 4 has a first centering element 28, the centering receptacle of which is of fork-shaped configuration. The first centering element 28 of the printing unit 4 interacts with a second centering element 29 on the transport unit 8 of the carrier 10 in such a way that the transport unit 8 is centered relative to the printing unit 4 and the print head 5 in the spacing direction. If the carrier 10 is pushed into the housing (not shown) of the printer 1, the second centering element 29 which is of cylindrical configuration passes between the two flanks, which lie opposite one another, of the first centering element 28 of fork-shaped configuration on the printing unit 4, as shown in FIG. 2.

A force 14 which is exerted counter to the carrier 10 is propagated via second contact faces on the first centering element 28 of the carrier 10 or on the transport unit 8 via first contact faces on the second centering element 29 of the printing unit 4 to the elastic element 13 which presses the printing unit 4 against the carrier 10 or the transport unit 8. In this way, a tolerance compensation is carried out of the relative position of the printing unit 4 and the transport unit 8, as the printing unit 4 is pressed in the push-in direction 11 against the transport unit 8. At the same time, the two components are oriented with respect to one another in the spacing direction on account of the interaction of the first centering element 28 and the second centering element 29.

After the centering elements 28, 29 are oriented with respect to one another on account of the stressing by means of the elastic element 13, a joint movement of the carrier 10 and of the transport unit 8 and the printing unit 4 brings about the required overtravel for latching the locking unit 17.

FIG. 3 shows a transport unit 8 in perspective. A base carrier 41 has receptacles 42 for a transport roller 43 of the transport unit 8. The transport roller 43 is mounted in the receptacles 42 by means of the shaft 31. Free sections 46, 47, into which first centering elements 28*a, b* shown in FIG. 4 can be inserted, are provided on both sides of the transport roller 43 between side walls 45 of the base carrier 41 and the transport roller 43. In this way, the shaft 31 serves not only for mounting the transport roller 43, but the free sections 46, 47 form the second centering elements 29*a, b* which interact with the first centering elements 28*a, b* on the printing unit 4.

FIG. 4 shows the printing unit 4, that is configured to be arranged in housing 100 (FIG. 2) in perspective view from obliquely above. A flat conductor sheet tape 48 serves to actuate the printing unit 4. As shown in FIG. 5, the first centering elements 28*a, b* which are provided on the printing unit 4 interact with the second centering elements 29*a, b* which are provided on the transport unit 8, in such a way that centering is carried out both in the spacing direction and in the push-in direction 11 on account of the fork-shaped configuration of the first centering elements 28*a, b* on the printing unit 4, and the width of the sections 46, 47 on the shaft 31 at the same time ensures lateral guidance or centering. Horizontal movement play, transversely with respect to the push-in direction, is between 0.5 mm and 1.5 mm. Horizontal movement play in the push-in direction is between 0.5 mm and 1.5 mm. Vertical movement play transversely with respect to the push-in direction is between 0.5 mm and 1.5 mm.

The moveable parts interact with a sensor 102 which senses a locked position, in which the media unit 26 or the carrier 10 and the printing unit 4 are fixed in the spacing direction with respect to one another, and/or an unlocked position, in which the media unit 26 or the carrier 10 and the printing unit 4 are not fixed in the spacing direction with respect to one another.

FIG. 6 shows a perspective illustration of an assembly of the printing unit 4 with a connecting element 30 which connects laterally arranged first and second guide elements 19*a*, 19*b* (shown in FIG. 7) to one another in a manner which engages over the carrier 10, in order to guide the carrier 10 laterally. The printing unit 4 which is mounted movably in the push-in direction 11 is mounted resiliently on the connecting element 30 by means of an elastic element 13, namely a torsion bar 60. If second centering elements 29*a, b* slide into the first centering elements 28*a, b* and there is a further movement in the push-in direction 11 of the carrier 10 or the transport unit 8, the printing unit 4 is clamped between the elastic element 13 and the second centering elements 29*a, b*. In this way, the printing unit 4 is oriented relative to the transport unit 8 or the carrier 10, with respect to all three spatial directions, with the result that the printing head 5 of a printing unit 4 is always oriented correctly with respect to the medium (not shown).

FIG. 8 shows in perspective how the transport unit 8 is arranged with respect to the carrier 10. In the manner of a drawer, the carrier 10 has lateral first guide elements 19*a*, 19*b* which interact with second guide elements 20a, 20b in such a way that the carrier 10 can be moved in the push-in direction 11 and counter to the push-in direction 11 out of the housing (not shown), with the result that the medium can be changed comfortably. The first and second guide elements 19a, 19b, 20a, 20b are of arcuate configuration.

FIG. 9 shows a perspective exploded illustration of the carrier 10 of the transport unit 8. Movable parts 18 of the locking unit 17 are assigned to the carrier 10.

FIG. 10 shows an exploded illustration, and FIG. 11 shows as a simple assembly, an overall construction comprising the transport unit 8, the printing unit 4, the carrier 10, the lateral guide elements 19a, 19b, 20a, 20b and the central connecting element 30 between the lateral guide elements 19a, 19b, 20a, 20b. Stationary parts of the locking unit 17 are attached fixedly to the connecting element 30. The laterally arranged guide elements 19a, 19b, 20a, 20b are fastened to the connecting element 30 by means of conical nuts 80 with one-sided conical bore ends which enclose in each case conical collars 81 of half-bores 82. The arrangement is fastened to a housing wall by means of screws (not shown) which are screwed into the conical nuts 80, with the result that the lateral guide elements 19a, 19b, 20a, 20b are clamped with the connecting element 30 at the same time.

The invention claimed is:

1. A printer for a tachograph of a motor vehicle, comprising:
a housing,
a printing unit comprising a non-pivotably mounted print head,
a media unit for accommodating a medium which is to be printed, the media unit comprising a carrier and arranged to be jointly moved with the carrier, wherein the carrier comprises lateral first guide elements arranged in a manner of a drawer and which interact with second guide elements in such a way that the carrier can be moved in a push-in direction and counter to the push-in direction out of the housing, the media unit further arranged to be moved relative to the printing unit in the push-in direction into an operating position and counter to the push-in direction out of an operating position, and further moved at least partly out of the housing,
wherein the print head is configured to move longitudinally together with the printing unit in the push-in direction and the printing unit is configured to be moved in the housing within a movement play, and
wherein means for orienting the printing unit with respect to the media unit are provided and arranged such that the printing unit and the media unit are oriented with respect to one another when the media unit is pushed in the push-in direction.

2. The printer according to claim 1, wherein the printing unit is arranged to be moved in the housing, in the push-in direction and counter to the push-in direction, to the extent of a substantially horizontal movement play.

3. The printer according to claim 2, wherein the horizontal movement play in the push-in direction is between 0.5 mm and 1.5 mm.

4. The printer according to claim 1, wherein the printing unit is arranged to be moved in the housing, transversely with respect to the push-in direction, to the extent of a substantially horizontal movement play.

5. The printer according to claim 4, wherein the horizontal movement play transversely with respect to the push-in direction is between 0.5 mm and 1.5 mm.

6. The printer according to claim 1, wherein the printing unit is arranged to be moved in the housing, transversely with respect to the push-in direction, to the extent of a substantially vertical movement play.

7. The printer according to claim 6, wherein the vertical movement play transversely with respect to the push-in direction is between 0.5 mm and 1.5 mm.

8. The printer according to claim 1, wherein the printing unit is mounted in the housing in a floating manner.

9. The printer according to claim 1, wherein the printer further comprises at least one elastic element arranged to press the printing unit counter to the push-in direction with a force such that the force presses the printing unit counter to the carrier when the latter is pushed in.

10. The printer according to claim 9, wherein the elastic element is arranged such that, when the media unit is not in the operating position, the elastic element presses the printing unit in the housing against stops which limit the movement play.

11. The printer according to claim 9, wherein the printing unit further comprises a first contact region and the housing has a second contact region and, by means of the force of the elastic element, the printing unit is arranged to move with the first contact region in the direction of the second contact region, in a rest position which is not the operating position, the first contact region is arranged to bear against the second contact region and the printing unit is clamped in this way between the elastic element and the second contact region by means of the force from the elastic element.

12. The printer according to claim 1, wherein the carrier further comprises first contact faces, the printing unit further comprises second contact faces, and the first and second contact faces correspond with one another in such a way that, when the carrier is moved in the push-in direction, the first contact faces come into contact with the second contact faces in pairs.

13. The printer according to claim 1, wherein the printing unit further comprises at least one first centering element and the carrier further comprises at least one second centering element which corresponds to the first centering element, such that, when the carrier is moved in the push-in direction, the carrier and the printing unit are oriented in the housing by means of the centering elements in the operating position, relative to one another in a spacing direction, and/or are centered in at least one direction perpendicular with respect to the spacing direction.

14. The printer according to claim 1, wherein the media unit further comprises a receptacle for the printing medium, in particular for a paper roll, and a transport unit for the printing medium comprising paper of the paper roll.

15. The printer according to claim 1, wherein the media unit is arranged to be locked in an operating position in the housing by means of a locking unit.

16. The printer according to claim 15, wherein the locking unit comprises movable parts which are constituent parts of the media unit which are fastened to the media unit.

17. The printer according to claim 15, wherein the locking unit comprises stationary parts which are connected fixedly to the housing and interact in a locking manner with movable parts on the carrier.

18. The printer according to claim 15, wherein the locking unit comprises at least two holding elements which are arranged symmetrically with respect to the elastic element.

19. The printer according to claim 15, wherein movable parts of the media unit and the printing unit are arranged to interact with a sensor which senses a locked position, wherein the media unit or the carrier and the printing unit are fixed in a spacing direction with respect to one another, and/or an unlocked position, and wherein the media unit or the carrier and the printing unit are not fixed in the spacing direction with respect to one another.

20. The printer according to in claim 1, wherein, in an operating position, the carrier is arranged to be sealed off with the housing as tightly as possible with respect to surroundings.

21. The printer according to claim 1, wherein the printer comprises at least one guide which has at least two first guide elements which are arranged on the carrier, and further comprises two second guide elements which correspond with the first guide elements on the carrier, such that the carrier is guided by means of the guide in the event of a movement in or counter to the push-in direction, and the second guide elements are fastened to a central connecting element.

\* \* \* \* \*